United States Patent [19]

Cheng

[11] Patent Number: 4,466,087
[45] Date of Patent: Aug. 14, 1984

[54] OPTICAL MEMORY SYSTEM FOR A READING/WRITING, VERIFYING AND TRACKING MODULE

[75] Inventor: David Cheng, San Jose, Calif.
[73] Assignee: Xerox Corporation, Stamford, Conn.
[21] Appl. No.: 223,200
[22] Filed: Jan. 8, 1981
[51] Int. Cl.³ .............................................. G11B 7/12
[52] U.S. Cl. ...................................... 369/45; 369/46; 369/121
[58] Field of Search ............................ 369/44, 45, 46

[56] References Cited

U.S. PATENT DOCUMENTS

| | | | |
|---|---|---|---|
| 3,991,275 | 11/1976 | Bulthais | 369/44 |
| 4,023,185 | 5/1977 | Bloom et al. | 369/45 |
| 4,118,735 | 10/1978 | Wilkinson | 369/44 |
| 4,241,423 | 12/1980 | Burke et al. | 369/45 |
| 4,290,122 | 9/1981 | Bates et al. | 365/234 |
| 4,334,299 | 6/1982 | Komurasaki et al. | 369/44 |

FOREIGN PATENT DOCUMENTS

| | | | |
|---|---|---|---|
| 52-73702 | 6/1977 | Japan | 369/45 |
| 54-39103 | 3/1979 | Japan | 369/45 |
| 54-104302 | 8/1979 | Japan | 369/45 |

OTHER PUBLICATIONS

Spie vol. 222 Laser Scanning and Recording for Advanced Image and Data Handling (1980) pp. 128-135 (Sep. 10, 1980).
Archival Optical Disk Data Storage, G. J. Ammon.

*Primary Examiner*—George G. Stellar
*Attorney, Agent, or Firm*—Franklyn C. Weiss

[57] ABSTRACT

A single semiconductor laser (10) is utilized in an optical system (2) to record and readback from a recording media such as a spinning disk (24). By means of a retro-reflecting light and optical system, the same optical path can be used not only for recording, but for readback of the recorded data on the recording media (24). A polarizing beam splitter (16) causes the light beam (8) to pass through an optical system whereby both focus error and tracking error as well as the data signal can be generated. By dithering the light beam across the recorded track in accordance with data signal, a tracking error signal is generated to cause the dithering motion of the galvanometer (20) to maintain its center tracking of the recorded information. By the use of a separate beam splitter (30), a focus error signal can be detected by means of error signals from complementary detectors S1, S2 to maintain accurate focus of the applied light beam on the recording media.

5 Claims, 1 Drawing Figure

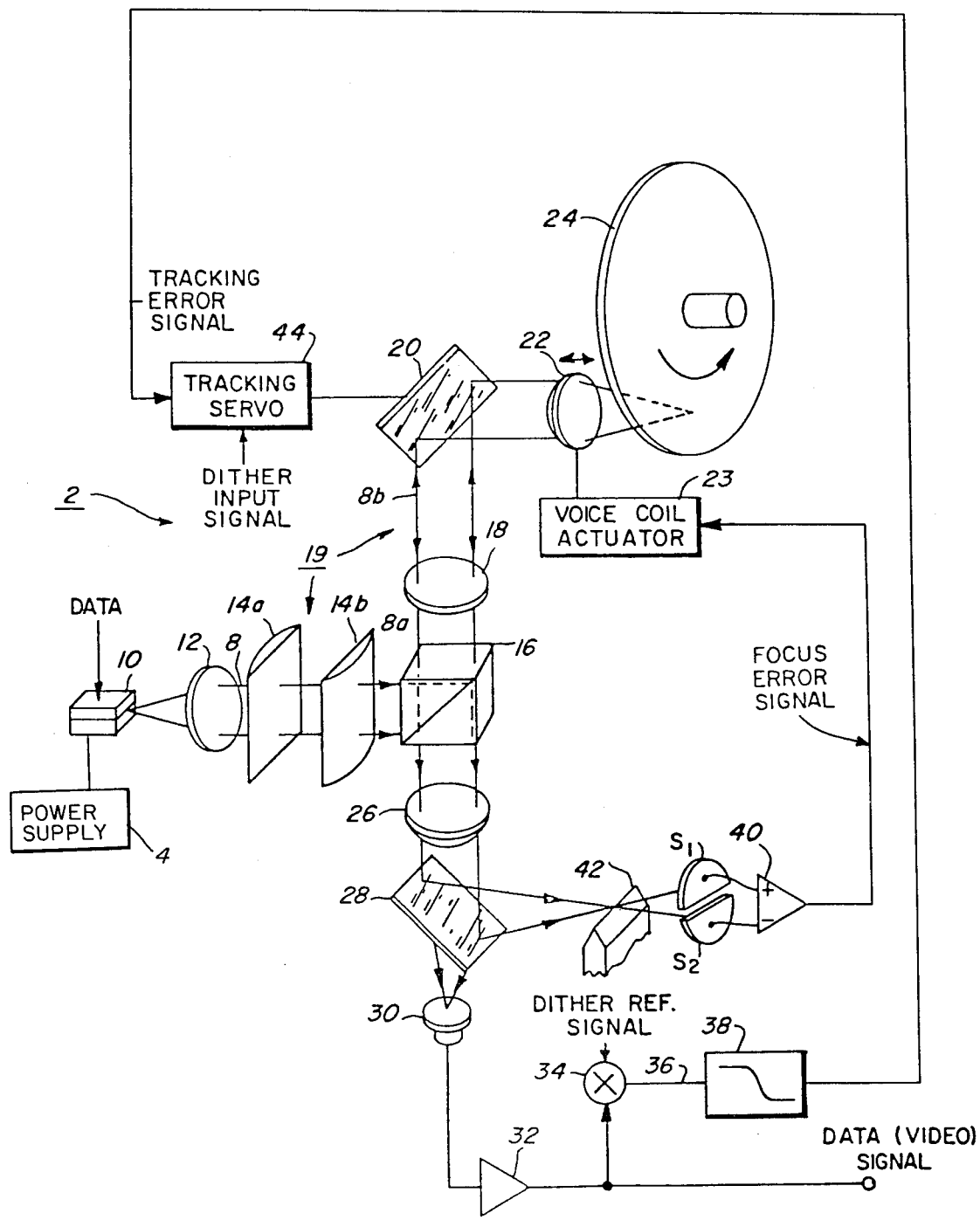

OPTICAL MEMORY SYSTEM FOR A READING/WRITING, VERIFYING AND TRACKING MODULE

An optical memory system using a single diode laser for a reading/writing, verifying and tracking module.

The invention relates to an optical memory system for a reading/writing, verifying and tracking module using a single diode laser; the optical memory system having particular applicability to optical disk recording systems.

BACKGROUND OF THE INVENTION

In the optical memory field, those used with optical disk systems, for example, separate lasers with different wavelengths are used for writing, reading, and tracking of the read/write laser spots on the disk and inside the track. The major advantages of such a system are good performance and versatility; while the major disadvantages are complicated optics, critical alignment, and they are bulky and expensive. One prior art type of laser recording apparatus utilizing a servo control to control the angular position of the beam splitter to obtain a maximum readout signal from the beam splitter is disclosed in U. S. Pat. No. 3,474,457, entitled "Laser Recording Apparatus", which issued on Oct. 21, 1969. FIG. 1 of the patent discloses that a portion of the incident laser beam is reflected back from the information recording medium and a readout beam splitter is used to focus the beam onto a photodetector. The output of the photodetector produced by the reflected portion of the laser beam from the beam splitter provides an input to a servo controlled mechanism and operates to control the angular position of the beam splitter with respect to the laser beam to obtain the maximum readout signal from the beam splitter.

According to the present invention, a single semiconductor laser is utilized in an optical system to record and read back from a recording media such as a spinning disk. By means of a retroreflecting light and optical system, the same optical path can be used not only for recording, but for read back of the recorded data on the recording media. A polarizing beam splitter is utilized to cause the light beam to pass through an optical system whereby both focus error and tracking error as well as the data signal can be generated. By dithering the light beam across the recorded track in conjunction with the data signal, a tracking error signal is generated to cause the dithering motion of the applied galvanometer to maintain its center tracking of the recorded information. Similarly, by use of a separate beam splitter, a focus error signal can be detected by means of error signals from complementary detectors to cause a focusing lens to maintain at audio frequencies an accurate focus of the applied light beam on the recording media.

DESCRIPTION OF THE DRAWINGS

For a more complete understanding of the invention, reference may be had to the following detailed description of the invention in conjunction with the drawing wherein:

FIG. 1 is a representative schematic drawing of the optical module system for recording in an optical disk or other optical memory system.

DETAILED DESCRIPTION OF THE INVENTION

FIG. 1 shows a block diagram of the optical module utilizing the principles of the present invention. The light 8 from laser 10 is collected and collimated by lens system 12. Light then travels to anamorphic telescope lens system 14a and 14b where the light 8a is circularized. The linearly polarized laser beam 8a (s-polarization) is then totally reflected by a polarizing beam splitter 16 which reflects light up, in the direction of the drawing, to quarter wave plate 18. This quarter wave plate circularly polarizes the beam 8a into a beam 8b. Beam 8b is then reflected by a galvanometer mirror 20 which performs both tracking and introducing a small dither frequency for the tracking error signal during readout. The dither frequency would be typically 50 khz. The dither motion to the beam introduced by the galvanometer 20 causes the light beam to oscillate at the very high frequency of the dither across a small fraction of the track of the light beam as drawn on the recording media, which in this case is a spinning disk 24. Thus, the light being reflected by galvanometer 20 is focused by focusing lens 22 onto the recording medium 24. Lens 22 is mounted on a linear transducer 23 for focus tracking. That is, the focusing lens 22 is typically mounted in a voice coil arrangement whereby any vertical motion (with respect to the axis of the rotating disk 24) of the spinning disk, which would cause the beam to intermittently come into and out of focus, is corrected and the focus maintained on the disk at all times.

During the writing mode, laser 10 is abruptly pulsed at a high enough power, in the well known manner of operating a single semiconductor gallium arsenide type laser, in order to thermally record the written spots onto a thin metal film, which could be tellurium, on the spinning disk 24. The galvanometer 20 and focusing mirror assembly 22 could also be mounted on an arm or other relative motion apparatus (not shown) to introduce separate tracks on the spinning disk. Alternatively, the galvanometer and focusing lens assembly could be fixed with the spinning disk assembly moving in and out (by means not shown) to cause the generation of the spiral optical tracks on the spinning disk.

During the reading mode, laser 10 is operated at a lower continuous power so as to read the information on the disk but not cause any permanent deformation as in writing. The light generated by laser 10 in the reading mode passes through the collector 12, through the anamorphic telescope lens arrangement 14a and 14b, is reflected by polarizing beam splitter 16 through quarter wave plate 18, where the linearly polarized light beam 8a is caused to become a circular polarized light beam 8b, and is then reflected off of galvanometer 20 through the focusing lens 22 onto the recording media as in the write mode. But now, the reflected light, which is modulated by the recording data on the spinning disk 24, is then retroreflected back through focusing lens 22, off of the galvanometer 20, through the quarter wave plate 18 which now takes the circularly polarized (opposite to the incident beam) light beam reflected from the spinning disk and causes it to be linearly polarized but now in the orthogonal direction from the incident polarization 8a which allows the light to pass through the polarizing beam splitter 16 rather than being reflected back toward the laser 10. The light, thus passing through the polarizing beam splitter 16, impinges upon lens 26 which focuses the light onto detector 30 through beam splitter 28. The beam splitter 28 being of the normal type allows certain of the light to pass through the beam splitter to detector 30, which detects the information modulated light and converts it to an electrical signal in the manner of a normal silicon photo-diode or other type photo-detection device. The output of the photo-detector 30 would be coupled to an amplifier 32 to amplify the signal to pass to the output as digital data.

It is very important that the reading laser beam maintain its accuracy within the center of the recorded track on the spinning disk. If the laser light beam impinging on the spinning disk 24 varies off the center of the track, then the level of the output signal will drop accordingly or be modulated by the waving of the light beam and thus affect the output electrical signal. This tracking error is detected by synchronous detection of the dithered signal with the video signal which is then corrected by the tracking galvo servo. Dithering of the beam is the intentional introduction of a small known deviation of the beam from the track. Multiplier circuit 34 receives, as one input, a signal which is similar in frequency to the signal applied to the galvanometer to cause the dither effect to the applied laser light. The other input to the multiplier circuit 34 is the data signal from amplifier 32. However, multiplier circuit 34 is not concerned with the actual information in the data signal but is only interested in the variation of the data signal as affected by the errors caused by mistracking of the beam. Thus, multiplier circuit 34 multiplies the dither reference signal and the data signal to generate a signal at 36 which is representative of the tracking error modulated by the dithered signal. However, in order to correct the tracking of the laser beam, the high frequency dither signal as applied to the multiplier 34 and the galvanometer 20 is not necessary at this point. Low pass filter 38 detects the focus error signal while removing the high frequency dither signal so that the output signal comprises only the tracking error signal. Because the dither reference signal input applied to the multiplier 34 is in exact synchronous reference to the dither signal applied to the galvanometer 20, the tracking error signal applied to the galvanometer to cause the tracking error to be decreased by moving the light back toward the center of the track, can be a positive or negative value determined by what side of the track the beam was on when the error was detected.

The actual focus of the beam as focused by focusing lens 26 is detected by split detectors S1 and S2. That is, part of the light passed by lens 26 is reflected off the beam splitter 28 towards detectors S1 and S2. Between beam splitter mirror 28 and the detectors S1 and S2, is a knife edge 42. If at any particular time the light beam as focused onto the recording disk 24 is, in fact, in focus, the light passing over the knife edge 42 will be at the reflected focal point of lens 26 and thus both detectors S1 and S2 will receive the same amount of light and generate similar output electrical signals. The differential amplifier 40 detects the difference in signal such that, when the light beam is in focus, there is no difference in signal, the output focus error signal being zero indicating no change in focus need be made at this time. However, if there is a focus error caused by wobbles or other perturbations in the recording disk, the light beam from beam splitter 28 at the knife edge 42 will be out of focus and thus either detector S1 or S2 will receive more or less light than the other. Depending on whether S1 or S2 receives more or less light, the positive or negative focus error signal causes the focusing lens 22, via the voice coil activator system 23, typical in the prior art, to move back and forth in response to recording surface errors to maintain the light beam at the focal point on the recording media 24. The focus error signal could be as slow as one indication per RPM of the disk, or as fast as ten times the disk rotational speed, such as 450 RPM.

For accurate and rapid movement of the light beam from track to track, neighboring tracks can be accessed quickly by deflecting the galvanometer 20 onto tracks within the field of view of the focusing lens 22. Far away tracks can be accessed by mechanically translating the optical module 2 with respect to the disk 24, as above, by either moving the galvanometer 20 lateral to the surface of the disk or moving the disk with respect to a fixed galvanometer lens system.

Write data verification is an important and desirable feature for high capacity storage systems. For optical recording, experiments have shown that typical hole opening time for the recorded data is about 15-nsec (nano-seconds) in metal film. This means that the detection of the recorded data can be achieved 15-nsec after the beginning of the writing laser pulse. In this system, the written data can be verified by two methods:

(1) Read-during-Write: If the write laser pulse is longer than the hole opening time, then the hole opening can be detected by measuring the wave form of the write laser pulse using the data detector (30). If the reflected light intensity dropped at the later part of the write pulse as compared with the earlier part of the pulse, then this indicates the hole has been opened or the recording of this bit is successful.

(2) Read-after-Write: If the write laser pulse is shorter than the hole opening time, then the data verification can be achieved by the read detector (30) in a normal manner at a short delay corresponding to the hole opening time after the write pulse to verify the success in the recording event.

In the event of an unsuccessful recording, then the data can be rewritten to insure error free recording.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. An optical memory system wherein information is recorded and read back from a recording media (24), said memory system including an optical system to record on and read back from said recording media, comprising:
 a light source (10), said light source being driven at a higher power level to record said information on said recording media and being driven at a lower power level to read back information recorded on said recording media,
 a retro-reflecting optical path (19) including means for reflecting (16, 20), and directing (22) the light beam to the recording media in the write mode and for directing and reflecting the light beam to and from the recording media in the read mode, said means for reflecting and directing the light beam including:

a beam splitter means (16) for receiving the light from the light source (10) and reflecting all of said light in a first direction, galvanometer mirror means (20) in the path of said light reflected in said first direction for reflecting said light in a second direction toward said recording media (24), lens means (22) in the path of said light reflected in said second direction for focusing said light onto said recording media, the light reflected from said recording media in a read mode being retro-reflected back along the same path as in the write mode wherein said beam splitter means (16) passes all of said retro-reflected light further in the reverse of said first direction, second means (26) in the path of light in said reverse first direction from said beam splitter means (16) for focusing said light, electro-optic detector means (30) at the focal point of said light for generating a data electrical signal in response to the light impinging upon it, second beam splitter means (28) between said lens means (26) and said electro-optic detector means (30) for reflecting part of the light from said first mentioned beam splitter means (16) in a third direction, and complementary electro-optic detector means (S1, S2) in the path of light reflected in said third direction for generating a focus error signal, said focus error signal being applied to said first mentioned lens means (22) for maintaining the focus of said light beam on said recording media (24).

2. The optical system as set forth in claim 1 further including;

knife edge means (42) in the path of light between said second beam splitter means (28) and said complementary electro-optic detector means (S1, S2) and at the nominal focal point of said second lens means (26) for blocking part of the light to one or the other of said complementary electro-optic detector means depending on which side of the knife edge the focal point is due to defocus of the light on said recording media (24).

3. The optical system as set forth in claim 2 further including:

means (44) for applying a high frequency oscillating signal to said galvanometer mirror means (20) to cause a dither effect to the light reflected off of said galvanometer mirror means, said high frequency oscillating signal being applied to said first mentioned circuit means (34) such that the rise and fall of said data electrical signal due to mistracking of the beam on the recording media (24) is multiplied with said high frequency oscillating signal thereby generating a multiplied signal, and low pass filter means (38) for receiving said multiplied signal to generate said tracking error signal.

4. An optical memory system for recording and reading back information on and from a recording media (24), said recording media comprising a spinning disk whereupon input information is used to destructively deform the surface of said spinning disk in response to said input information, comprising:

a single laser light source (10), retro-reflective optical means (19) utilizing the same optical members for both recording and readback on and from said recording media of the laser light source, said retro-reflective optical means comprising:

galvanometer mirror means (20) in the path of said light for reflecting said light toward said recording media (24), said galvanometer mirror means being driven by a tracking error signal to maintain accurate tracking of said light beam on said recording media and by a dither input signal for high frequency oscillation of said light beam across the recording and recorded track of said light beam, adjustable lens means (22) in the path of light between said galvanometer mirror means (20) and the recording media (24) for maintaining the light beam in focus thereon, said lens means being driven by a focus error signal, whereby the light reflected from said recording media in a read mode is retro-reflected back along the same optical path (19) as in the write mode, focusing lens means (26) for focusing the light reflected back from said recording media throught the adjustable lens means (22) and said galvanometer mirror means (20), photodetector means (30) at the focal point of said light for generating data electrical signals in response to the light impinging upon it, beam splitter means (28) between the focusing lens means and said photodetector means for reflecting part of said light, and complementary photodetector means (S1, S2) in the path of said reflected light for generating a focus error signal, said focus error signal being applied to said adjustable lens means (22) for maintaining the focus of said light beam on said recording track.

5. The optical memory system as set forth in claim 4 wherein said adjustable lens means (22) comprises a voice coil actuator (23) and lens, said voice coil actuator moving said lens along its axis in response to said focus error signal.

* * * * *